United States Patent
Nakahara et al.

(10) Patent No.: US 7,226,697 B2
(45) Date of Patent: *Jun. 5, 2007

(54) ELECTRICITY STORAGE DEVICE

(75) Inventors: Kentaro Nakahara, Minato-ku (JP);
Shigeyuki Iwasa, Minato-ku (JP);
Masaharu Satoh, Minato-ku (JP); Jiro Iriyama, Minato-ku (JP); Yukiko Morioka, Minato-ku (JP)

(73) Assignee: NEC Corporation, Tokyo (JP)

( * ) Notice: Subject to any disclaimer, the term of this patent is extended or adjusted under 35 U.S.C. 154(b) by 117 days.

This patent is subject to a terminal disclaimer.

(21) Appl. No.: 10/473,158

(22) PCT Filed: Apr. 3, 2002

(86) PCT No.: PCT/JP02/03334

§ 371 (c)(1),
(2), (4) Date: Sep. 29, 2003

(87) PCT Pub. No.: WO02/082570

PCT Pub. Date: Oct. 17, 2002

(65) Prior Publication Data

US 2004/0115529 A1   Jun. 17, 2004

(30) Foreign Application Priority Data

Apr. 3, 2001   (JP) ............................ 2001-104629

(51) Int. Cl.
*H01M 4/60* (2006.01)
(52) U.S. Cl. ..................................... 429/213; 429/212
(58) Field of Classification Search ................ 429/213, 429/212
See application file for complete search history.

(56) References Cited

U.S. PATENT DOCUMENTS 4,397,922 A   8/1983   Pokhodenko et al.

(Continued)

FOREIGN PATENT DOCUMENTS

EP        0 176 921 A       4/1986

(Continued)

OTHER PUBLICATIONS

Miura et al., "A novel lipophillic spin probe for the measurement ofradiation damage in ,ouse brain using in vivo electron spin resonance (ESR)", Febs Letters, Elseveir Science Publishes, vol. 419, No. 1, Dec. 8, 1997, pp. 99-102, XP00426598.

(Continued)

*Primary Examiner*—Tracy Dove
(74) *Attorney, Agent, or Firm*—Sughrue Mion, PLLC

(57) ABSTRACT

A charge storage device such as a battery, wherein a positive electrode comprises a nitroxyl compound having a structure of a nitroxyl cation moiety represented by formula (I) in an oxidized state while having a structure of a nitroxyl radical moiety represented by formula (II) in a reduced state and a reaction represented by reaction formula (A) in which an electron is transferred between these states is used as a positive electrode reaction. The charge storage device can have a higher energy density and can be used at a large current.

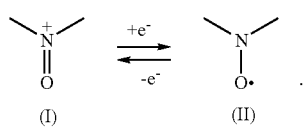

4 Claims, 4 Drawing Sheets

1 — Negative electrode current collector
2 — Insulating packing
3 — Negative electrode
4 — Separator
5 — Positive electrode
6 — Positive electrode current collector

U.S. PATENT DOCUMENTS 6,866,964 B2 * 3/2005 Nakahara et al. ............ 429/213
2003/0044681 A1 * 3/2003 Morioka et al. ............ 429/213

FOREIGN PATENT DOCUMENTS

| EP | 1 128 453 A | 8/2001 |
|---|---|---|
| JP | 60-127663 A | 7/1985 |
| JP | 2002-117853 A | 4/2002 |
| JP | 2002-117854 A | 4/2002 |
| JP | 2002-117855 A | 4/2002 |
| JP | 2002-170568 A | 6/2002 |

OTHER PUBLICATIONS

Kurosaki et al., "Polymers Having Stable Radicals, I. Synthesis of Nitroxyl polymers from 4-Methacryloyl Derivatives of 2,2,5,5-Tetramethylpiperdine", Journal of Polymer Science, vol. 10, No. 11, 1972, pp. 3295-3310, XP000892970.

Rozantzev et al., "Free Iminixyl Radicals in the Hydrogeneated Pyrole Series" TETRHEDRON, vo. 21, 1965, pp. 491-499 XP002287534.

Nakahara et al., "Rechargeable Batteries with Organic Radical Cathodes", Chemicals Physics Letters, vol. 359, 2002, pp. 351-351, XO002287535.

Merz A. Bachmann H. "Oligo(ethyleneglycol) Spacered Siloxane Redox Polymers: High Diffusive Media for Electrochemical Redox Catalysts" Journal of American Chemical Society, vol. 117, 1995, pp. 901-908, XP002287579.

Miura Y.: "Synthesis and properties of organic conjugated polyradicals", Magnetic Properties of Organic Materials (1999), pp. 267-284.

Nishide H., Kaneko T.: "Pendant and IT-conjugated organic polyradicals" Magnetic Properties of Organic Materials (1999), pp. 285-303.

* cited by examiner

ELECTRICITY STORAGE DEVICE

TECHNICAL FIELD

This invention relates to a charge storage device with a large energy density from which a large current can be drawn at one time.

BACKGROUND ART

As laptop personal computers, mobile phones and electric automobiles have rapidly expanded their markets, there have been needed a charge storage device with a higher energy density and a large current. Among others, a lithium ion secondary battery wherein a positive electrode uses a lithium-containing transition metal oxide while a negative electrode uses a carbon material has been used as a high-energy secondary battery in a variety of electronic devices.

However, since the lithium-ion secondary battery has a small reaction rate in an electrode reaction, a large current leads to significant deterioration in battery performance. Therefore, when used in a small electronic device, the battery requires a longer charging time. Also, the battery has not been used in a device such as an electric automobile requiring a large current.

On the other hand, an electric double layer capacitor using charcoal in an electrode can give a large current and exhibit good cycle properties. It has been, therefore, developed as a backup power source and a power source for an electric automobile. However, since it has a small energy density and thus size reduction has been difficult, it has not been utilized in mobile electronic devices. Furthermore, it has not been extensively mounted in an electric automobile due to its poor capacity.

As with an electric double layer capacitor, a lead storage battery can give a large current and exhibit good cycle properties. It has been, therefore, widely used as an auxiliary power source for an automobile. However, since its voltage and energy density are low, it has not been applied to an electric automobile in which a motor is driven by electric power.

As described above, a lithium-ion secondary battery cannot be used for a large current and an electric double layer capacitor or lead storage battery cannot give an adequate energy density required for a small electronic device. In other words, although there have been a variety of proposals for a charge storage device which can be applied to a mobile electronic device or electric automobile, no charge storage devices with a higher energy density through which a large current can be drawn have been obtained.

DISCLOSURE OF THE INVENTION

An objective of this invention is to provide a novel charge storage device with a higher energy density which can be used for an application at a large current density.

This invention relates to a charge storage device wherein a positive electrode comprises a nitroxyl compound having a structure of a nitroxyl cation moiety represented by formula (I) in an oxidized state while having a structure of a nitroxyl radical moiety represented by formula (II) in a reduced state and a reaction represented by reaction formula (A) in which an electron is transferred between these two states is used as positive electrode reaction.

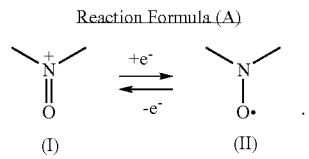

Reaction Formula (A)

Preferably, the nitroxyl compound is a compound containing a cyclic structure represented by general formula (Ia) in an oxidized state.

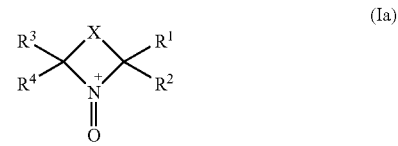

(Ia)

In formula (Ia), $R^1$ to $R^4$ independently represent alkyl having 1 to 4 carbon atoms; and X represents a bivalent group forming a five- to seven-membered ring. Formula (Ia) per se may be a low molecular weight compound or it may be a part of a polymer where X is a part of a side chain in the polymer or of a main chain of the polymer.

The nitroxyl compound is particularly preferably a polymer having a side chain comprising the structure represented by formula (Ia).

Figure 1:
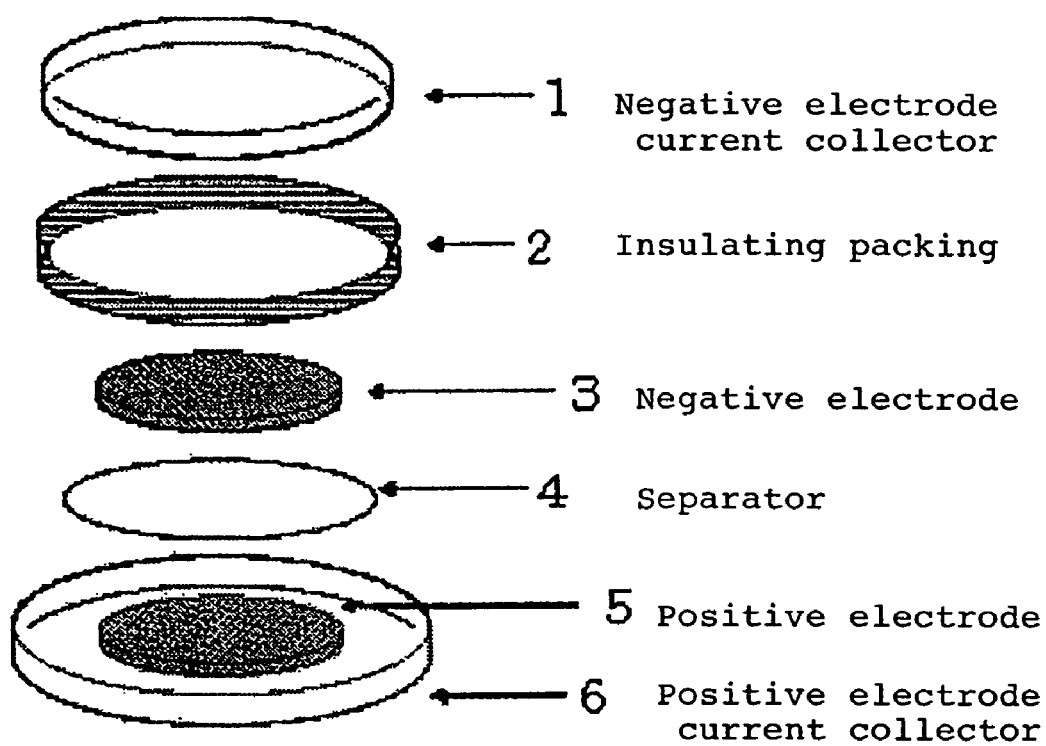
FIG. 1 schematically shows an illustrative configuration of a charge storage device.

In these figures, the symbols have the following means; 1: negative electrode current collector, 2: insulating packing, 3: negative electrode, 4: separator, 5: positive electrode, and 6: positive electrode current collector.

BEST MODE FOR CARRYING THE INVENTION

Nitroxyl structure, as shown in reaction formula (B), can take the states represented by formula (I) to (III) by transfer of electrons.

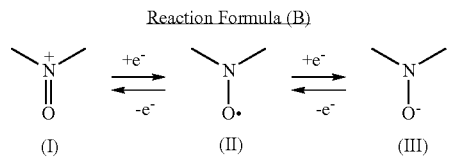

Reaction Formula (B)

Among these, this invention utilizes the reaction between formulas (I) and (II) as a positive electrode reaction, and the device functions as a charge storage device by storage and release of electrons associated with the reaction. Since the redox reaction is based on a mechanism without structural change of the organic compound, the reaction, therefore, proceeds at a large rate. Thus, the charge storage device of this invention makes it possible that large current flows at one time.

The term "charge storage device" as used herein refers to a device comprising at least a positive electrode and a negative electrode, through which electrochemically stored energy can be drawn as electric power. Examples of a charge storage device include a first battery and a rechargeable secondary battery; a capacity device such as a capacitor and a condenser; and other electrochemical switching devices.

A conventional battery where a positive electrode is made of, for example, a metal oxide cannot be used as a capacitive device such as a capacitor because it cannot give a large current at one time. In contrast, a charge storage device of this invention can be used as a backup power source for which an electric double layer capacitor has been used, a capacitor such as an electric power source for an automobile or a condenser for an electronic device. Utilizing its high speed charge/discharge properties, it may be also used as an electrochemical switching device where a charged and a discharged states are used as ON and OFF, respectively.

In the charge storage device, a positive electrode is an electrode having a higher redox potential while a negative electrode is an electrode having a lower redox potential.

A nitroxyl structure in this invention is preferably a cyclic nitroxyl moiety represented by formula (Ia). In a reduced state, the nitroxyl structure of formula (Ia) becomes a nitroxyl radical represented by formula (II).

$R^1$ to $R^4$ are preferably linear alkyl, particularly methyl in the light of radical stability.

Ring-member atoms in X are selected from the group consisting of carbon, oxygen, nitrogen and sulfur. Specific examples of X include —CH$_2$CH$_2$—, —CH$_2$CH$_2$CH$_2$—, —CH$_2$CH$_2$CH$_2$CH$_2$—, —CH=CH—, —CH=CHCH$_2$—, —CH=CHCH$_2$CH$_2$— and —CH$_2$CH=CHCH$_2$—, where non-adjacent —CH$_2$— group(s) may be replaced with —O—, —NH— or —S—; —CH= may be replaced with —N=; and hydrogen attached to a ring-member atom may be replaced with alkyl group, halogen, =O, ether group, ester group, cyano or amide group.

A particularly preferable cyclic nitroxyl structure in oxidized state is selected from the group consisting of 2,2,6,6-tetramethylpiperidinoxyl cation represented by formula (1), 2,2,5,5-tetramethylpyrrolidinoxyl cation represented by formula (2) and 2,2,5,5-tetramethylpyrrolinoxyl cation represented by formula (3).

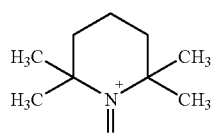

(1)

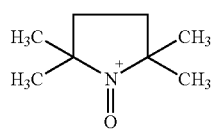

(2)

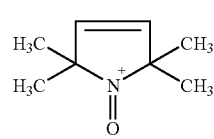

(3)

The cyclic structure represented by formula (Ia) per se may be a low molecular weight compound or it may be a part of a polymer. When it is a part of a polymer, it may be either in a side chain or in a main chain. In the light of easiness in synthesis, it is preferably in a side chain.

When present in a side chain, the moiety is attached to the main polymer chain via a residual group X' derived from X by eliminating hydrogen from a ring-member —CH$_2$—, —CH= or —NH—.

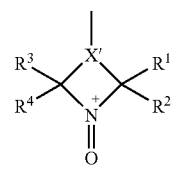

(Ib)

wherein $R^1$ to $R^4$ are as defined above.

Polymer used may not be restricted to a particular one and can be any polymer having the cyclic structure represented by formula (Ia) in a side chain.

Specific examples include compounds in which the group represented by formula (Ib) is attached to the following polymers or those in which a part of atom or group in the polymers are replaced with the group represented by formula (Ib). In both cases, the group represented by formula (Ib) may be attached not directly, but via an appropriate bivalent group as a linker.

Examples of a polymer which can be used include:

polyalkylene polymers such as polyethylene, polypropylene, polybutene, polydecene, polydodecene, polyheptene, polyisobutene and polyoctadecene;

diene polymers such as polybutadiene, polychloroprene, polyisoprene and polyisobutene;

poly(meth)acrylic acid;

poly(meth)acrylonitrile;

poly(meth)acrylamide polymers such as poly(meth)acrylamide, polymethyl(meth)acrylamide, polydimethyl(meth)acrylamide and polyisopropyl(meth)acrylamide;

polyalkyl(meth)acrylates such as polymethyl(meth)acrylate, polyethyl(meth)acrylate and polybutyl(meth)acrylate;

fluorinated polymers such as polyvinylidene fluoride and polytetrafluoroethylene;

polystyrene polymers such as polystyrene, polybromostyrene, polychlorostyrene and polymethylstyrene;

vinyl polymers such as polyvinyl acetate, polyvinyl alcohol, polyvinyl chloride, polyvinyl methyl ether, polyvinyl carbazole, polyvinylpyridine and polyvinylpyrrolidone;

polyether polymers such as polyethylene oxide, polypropylene oxide, polybutene oxide, polyoxymethylene, polyacetaldehyde, polymethyl vinyl ether, polypropyl vinyl ether, polybutyl vinyl ether and polybenzyl vinyl ether;

polysulfide polymers such as polymethylene sulfide, polyethylene sulfide, polyethylene disulfide, polypropylene sulfide, polyphenylene sulfide and polyethylene tetrasulfide and polyethylene trimethylene sulfide;

polyesters such as polyethylene terephthalate, polyethylene adipate, polyethylene isophthalate, polyethylene naphthalate, polyethylene paraphenylene diacetate and polyethylene isopropylidene dibenzoate;

polyurethanes such as polytrimethylene ethylene urethane;

polyketone polymers such as polyether ketone and polyallyl ether ketone;

polyanhyride polymers such as polyoxyisophthaloyl;

polyamine polymers such as polyethyleneamine, polyhexamethyleneamine and polyethylenetrimethyleneamine;

polyamide polymers such as nylon, polyglycine and polyalanine;

polyimine polymers such as polyacetyliminoethylene and polybenzoyliminoethylene;

polyimide polymers such as polyesterimide, polyetherimide, polybenzimide and polypyrromelimide;

polyaromatic polymers such as polyallylene, polyallylenealkylene, polyallylenealkenylene, polyphenol, a phenol resin, polybenzimidazole, polybenzothiazole, polybenzoxadine, polybenzoxazole, polycarborane, polydibenzofuran, polyoxyisoindoline, polyfurantetracarboxylic acid diimide, polyoxadiazole, polyoxyindole, polyphthalazine, polyphthalide, polycyanurate, polyisocyanurate, polypiperazine, polypiperidine, polypyrazinoquinoxane, polypyrazole, polypyridazine, polypyridine, polypyromellitimine, polyquinone, polypyrrolidine, polyquinoxaline, polytriazine and polytriazole;

polysaccharides such as cellulose;

siloxane polymers such as polydisiloxane and polydimethylsiloxane;

polysilane polymers;

polysilazane polymers;

polyphosphazene polymers;

polythiazyl polymers; and conjugated polymers such as polyacetylene, polypyrrole and polyaniline.

Among these, preferable are polyalkylene polymers, poly(meth)acrylic acid, poly(meth)acrylamide polymers, polyalkyl (meth)acrylates and polystyrene polymers in the light of electrochemical resistance of a main chain. The term "main chain" as used herein refers to a carbon chain having the highest number of carbon atoms.

Particularly, a polymer is preferably selected such that it can comprise a unit represented by formula (Ic) in an oxidized state.

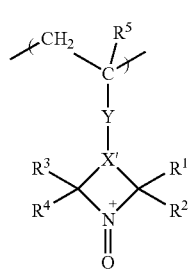

(Ic)

In the formula, $R^5$ is hydrogen or methyl. Y is, but not limited to, —CO—, —COO—, —CONR$^6$—, —O—, —S—, optionally substituted alkylene having 1 to 18 carbon atoms, optionally substituted arylenes having 1 to 18 carbon atoms or a bivalent group where two or more of these groups are combined together; and $R^6$ is hydrogen or alkyl having 1 to 18 carbon atoms.

A particularly preferable unit represented by formula (Ic) can be that represented by any of formulas (4) to (6).

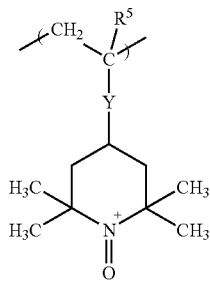

(4)

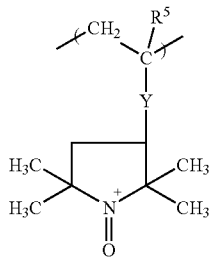

(5)

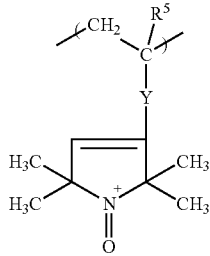

(6)

In these formulas (4) to (6), Y is particularly —COO— or —CONR$^6$—.

In this invention, the group represented by formula (Ia) may be not present in all side chains. For example, all units constituting a polymer may be represented by formula (Ic), or only a portion of unit may be represented by formula (Ic). Its content in the polymer may depend on an application, the structure of the polymer and a preparation process. At least, a small amount must be present. Specifically, it is 0.1 wt % or more, generally 1 wt % or more, preferably 10 wt % or more. When there are no restrictions to polymer synthesis and it is desired to store charge as much as possible, the content is preferably 50 wt % or more, particularly 80 wt % or more.

Such a polymer can be synthesized as follows. For example, a monomer represented by formula (IV) may be homopolymerized or copolymerized with a copolymerizable monomer such as an alkyl acrylate to give a polymer, whose —NH— moiety may be then converted into —N(O·)— to give a polymer having a unit represented by formula (Ic) in an oxidized state.

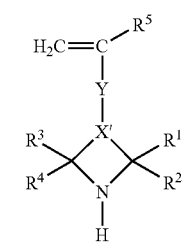

(IV)

Alternatively, for example, methacrylic acid and the like may be polymerized to give a base polymer, to which may be then introduced a group represented by formula (Ib) (or a group having —NH— before oxidation into NO radical) by a polymer reaction.

When a charge storage device of this invention has an electrolyte containing a solvent, it is preferable that a nitroxyl compound is insoluble in the electrolyte, i.e., high durability. Therefore, although there are no restrictions to a molecular weight of a polymer comprising a cyclic nitroxyl structure represented by formula (Ia), the polymer preferably has a sufficient molecular weight to make the polymer insoluble in the electrolyte, but it depends on a combination of the electrolyte and the type of the solvent. The molecular weight is generally 1,000 or more, preferably 10,000 or more, particularly 100,000 or more. Since the polymer can be added as powder to a positive electrode in this invention, any larger molecular weight may be acceptable. Generally, it is 5,000,000 or less. A polymer comprising a cyclic nitroxyl structure represented by formula (Ia) may be crosslinked to improve its resistance to an electrolyte.

Nitroxyl cation represented by formula (I) is generally stabilized by an anion from electrolyte; for example, $PF_6^-$, $ClO_4^-$, $BF_4^-$, $Br^-$, $Cl^-$, $F^-$, imide type electrolyte salt anion and methide type electrolyte salt anion.

A nitroxyl compound in a positive electrode functions as an active material contributing to charging. Therefore, for example, a cathodic active material in a conventional battery may be totally replaced with a nitroxyl compound defined in this invention. Furthermore, even when part of the conventional active material is replaced, a current may be correspondingly increased. There are, therefore, no restrictions to a replacement ratio to the whole active material. The compound may be correspondingly effective at 0.1 wt % or more to the whole active material and adequately effective at 10 wt % or more. When it is desired to store charge as much as possible, the amount may be preferably 50 wt % or more, particularly 80 wt % or more, especially 100 wt %. The nitroxyl compound is comprised of elements having a small atomic weight such as carbon, hydrogen, nitrogen and oxygen, and therefore, can store much electrical charge with a small weight. Thus, it can provide a charge storage device with a high energy density.

A conventional active material may be any of known appropriate materials; for example, metal oxides such as $LiMnO_2$, $LiCoO_2$, $LiNiO_2$ and $Li_xV_2O_5$ (0<x<2).

In addition to an active material, a positive electrode may comprise other known constituents; for example, a conductivity enhancing material including carbon materials such as charcoal, graphite, carbon black and acetylene black and conductive polymers such as polyacetylene, polyphenylene, polyaniline and polypyrrole; and a binder including resins such as polyvinylidene fluoride, polytetrafluoroethylene, a copolymer of vinylidene fluoride and hexafluoropropylene, a copolymer rubber of styrene and butadiene, polypropylene, polyethylene and a polyimide. In addition, the positive electrode may contain, for example, a disulfide, a catalytic compound or an ion-conductive polymer as appropriate.

When a nitroxyl compound is a polymer, it may also act as a binder, depending on some factors such as the type of a polymer main chain, the type of a side chain having the cyclic nitroxyl structure and the type of a side chain without the cyclic nitroxyl structure. Such a polymer may eliminate or reduce a conventional binder. Alternatively, while using a conventional active material, a polymer comprising a cyclic nitroxyl structure may be used as a binder. In this case, the amount corresponding to the binder also acts as an active material, resulting in an increased capacity.

When a polymer main chain consists of a conductive polymer such as polyacetylene and polyaniline and its side chain comprises a cyclic nitroxyl structure, a polymer comprising a cyclic nitroxyl structure may also act as a conductivity enhancing material. It may eliminate or reduce a conventional conductivity enhancing material. Alternatively, while using a conventional active material, a polymer comprising a cyclic nitroxyl structure may be used as a conductivity enhancing material. In this case, the amount corresponding to the conductivity enhancing material also acts as an active material, resulting in an increased capacity.

A nitroxyl cation structure is believed to inactivate impurities such as water and an alcohol in an electrolyte to prevent performance deterioration of a charge storage device.

In any case, a polymer nitroxyl compound is particularly effective because of its lower solubility in an electrolyte containing an organic solvent and thus its higher durability.

A charge storage device of this invention comprises, in addition to a positive electrode as described above, at least a negative electrode and preferably an electrolyte. FIG. 1 shows its structure. The charge storage device shown in this figure has a structure where a negative electrode 3 and a positive electrode 5 are laminated via a separator 4 containing an electrolyte. However, since a charge storage device of this invention comprises at least a negative electrode 3 and a positive electrode 5 as essential components, a negative electrode current collector 1, an insulating packing 2, a separator 4 and a positive electrode current collector 6 are optional.

The charge storage device may have any known shape. For example, the charge storage device may have a shape where an electrode laminate or roll is sealed in a metal case, a resin case or a laminate film. It may have an appropriate appearance such as a cylinder, a square, a coin and a sheet.

A negative electrode may be made of a well-known material for a charge storage device electrode, including carbon materials such as charcoal, graphite, carbon black and acetylene black; elemental metals or metal alloys such as lithium metal or lithium alloys and lithium-ion storage carbon; and conductive polymers such as polyacetylene, polyphenylene, polyaniline and polypyrrole. A negative electrode may further contain a resin binder such as polyvinylidene fluoride, polytetrafluoroethylene, a copolymer of vinylidene fluoride and hexafluoropropylene, a copolymer rubber of styrene and butadiene, polypropylene, polyethylene and polyimide; a disulfide; a catalytic compound; and ion-conductive polymers, as appropriate.

A negative electrode current collector 1 and a positive electrode current collector 6 may be made of, for example, nickel, aluminum, copper, gold, silver, titanium, an aluminum alloy, stainless steel and a carbon material. They may have an appropriate shape such as a foil, a plate and a mesh. It may be also possible that the current collector is active as a catalyst and may be chemically bound to an active material. The charge storage device of this invention may comprise a separator consisting of a porous film or a nonwoven fabric in order to prevent a negative electrode 3 from being in electrically contact with a positive electrode 5. Furthermore, the device may comprise an insulating packing 2 consisting of a plastic resin in order to prevent a negative electrode current collector 1 from being in electrically contact with a positive electrode current collector 6.

A charge storage device of this invention may comprise a well-known electrolyte. An electrolyte is generally responsible for transferring a charge carrier between a negative electrode and a positive electrode, and generally has an electrolyte ion conductivity of $10^{-5}$ to $10^{-1}$ S/cm at room temperature. An electrolyte used in this invention may be an electrolyte solution prepared by, for example, dissolving an electrolyte salt in a solvent. Examples of such a solvent include organic solvents such as ethylene carbonate, propylene carbonate, dimethyl carbonate, diethyl carbonate, methyl ethyl carbonate, γ-butyrolactone, tetrahydrofuran, dioxolane, sulfolane, dimethylformamide, dimethylacetamide and N-methyl-2-pyrrolidone; and an aqueous solution of sulfuric acid or water. In this invention, these solvents may be used alone or in combination of two or more. In particular, when using an organic solvent, a polymer nitroxyl compound may improve durability.

Examples of an electrolyte salt include $LiPF_6$, $LiClO_4$, $LiBF_4$, $LiCF_3SO_3$, $LiN(CF_3SO_2)_2$, $LiN(C_2F_5SO_2)_2$, $LiC(CF_3SO_2)_3$, $LiC(C_2F_5SO_2)_3$, LiBr, LiCl and LiF.

In the structure of the charge storage device shown in FIG. 1, an electrolyte solution is contained in a separator 4.

Alternatively, a solid electrolyte may be used. Among solid electrolytes, examples of an organic solid electrolyte material include vinylidene fluoride polymers such as polyvinylidene fluoride and a copolymer of vinylidene fluoride and hexafluoropropylene; acrylonitrile polymers such as a copolymer of acrylonitrile and methyl methacrylate and a copolymer of acrylonitrile and methyl acrylate; and polyethylene oxide. These polymer materials may be used as a gel containing an electrolyte solution or only polymer materials are used. Examples of an inorganic solid electrolyte include $CaF_2$, AgI, LiF, β-alumina and a glass material. When using such a solid electrolyte, a separator may not be necessary.

A positive electrode may be formed by any known process; for example, adding a solvent to component materials and then applying the resulting slurry to an electrode current collector, adding a binder resin to component materials and then compressing the mixture, or sintering the component materials by heating. It is preferable that a nitroxyl compound is homogeneously distributed in a positive electrode. The compound may be ground before use when it is insoluble in a solvent.

A nitroxyl structure used in forming a positive electrode may be in a reduced state having a radical represented by formula (II) or in an oxidized state having a cation represented by formula (I).

EXAMPLES

This invention will be more specifically described with reference to examples.

<Preparation of a polymer containing a cyclic nitroxyl structure>

In a 100 mL eggplant-shaped flask equipped with a reflux condenser was placed 20 g of 2,2,6,6-tetramethylpiperidine methacrylate monomer (0.089 mol), which was then dissolved in 80 mL of dry tetrahydrofuran. To the mixture was added 0.29 g of azobisisobutyronitrile (AIBN) (0.00187 mol) (monomer/AIBN=50/1), and the mixture was stirred at 75 to 80° C. under an argon atmosphere. After 6 hours, the mixture was allowed to be cooled to room temperature. The resulting polymer was precipitated in hexane, collected by filtration and dried in vacuo to provide 18 g of poly(2,2,6,6-tetramethylpiperidine methacrylate) (yield: 90%).

Then, 10 g of poly(2,2,6,6-tetramethylpiperidine methacrylate) was dissolved in 100 mL of dry dichloromethane. To the stirred solution at room temperature was added dropwise a solution of 15.2 g of m-chloroperbenzoic acid (0.088 mol) in 100 mL of dichloromethane over 1 hour. After stirring for further six hours, precipitated m-chlorobenzoic acid was removed by filtration, the filtered solution was washed with an aqueous solution of sodium carbonate and water, and then dichloromethane was evaporated. The residual solid was ground. The resulting powder was washed with diethyl carbonate (DEC) and dried in vacuo to give 7.2 g of poly(2,2,6,6-tetramethylpiperidinoxy methacrylate)(PTME) as a dark brown powder in an yield of 68.2%. The structure of the polymer obtained was identified by IR. The GPC results indicated a weight average molecular weight (Mw) of 89,000 and a dispersion (Mw/Mn) of 3.30. A spin concentration was $2.51 \times 10^{21}$ spin/g as determined by ESR spectrometry. The value corresponds to a spin concentration assuming that the N—H group in poly(2,2,6,6-tetramethylpiperidine methacrylate) is 100% converted into an N—O radical and all the monomer units in the polymer have a radical.

In a similar manner, poly(2,2,5,5-tetramethylpyrrolidinoxy methacrylate) represented by formula (8) and poly(2,2,5,5-tetramethylpyrrolinoxy methacrylate) represented by formula (9) were prepared.

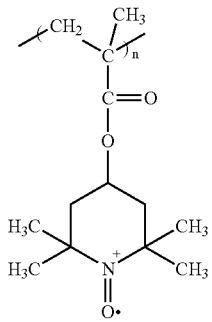

(7)

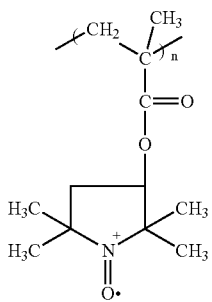

(8)

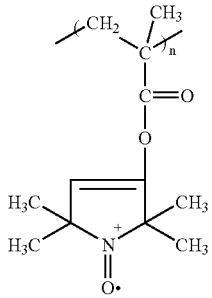

(9)

Example 1

Twenty five milligrams of the polymethacrylate represented by formula (7) prepared above, 200 mg of graphite powder and 25 mg of a polytetrafluoroethylene resin binder were weighed and blended in an agate mortar. After dry mixing for 10 min, the resulting mixture was roller extended while applying pressure to give a thin electrode plate with a thickness of 215 μm. The thin electrode plate was dried overnight in vacuo at 80° C., punched into disks with a diameter of 12 mm and shaped into an electrode for a charge storage device. The total weight of the electrode was 14.4 mg, which contains 1.44 mg (10 wt %) of the polymethacrylate represented by formula (7). A bulk density of the electrode was 0.533 g/cm$^3$.

The electrode was immersed in an electrolyte solution to allow the electrolyte solution to enter vacancies. An electrolyte solution used was a mixed solution of ethylene carbonate and diethyl carbonate (mixing ratio=3:7) containing 1 mol/L of LiPF$_6$ as electrolyte salt. The electrode impregnated with the electrolyte solution was placed on a positive electrode current collector, on which was then laminated a porous film separator similarly impregnated with the electrolyte solution. On the laminate was further placed a lithium metal plate to be a negative electrode, and then a negative electrode current collector covered with an insulating packing was laminated. The resulting laminate was compressed by a caulker to provide an enclosed coin type of charge storage device.

The charge storage device thus prepared had an equilibrium potential of 2.7 V. The charge storage device obtained was charged at a fixed current of 1 mA and charging was terminated when a voltage reached 4.0 V. The charge storage device after charging was disassembled. By analyzing the positive electrode, it was observed that a radical concentration was reduced and a corresponding 2,2,6,6-tetramethylpiperidinoxyl cation was formed. The cation was stabilized by electrolyte anion PF$_6^-$.

Figure 2:
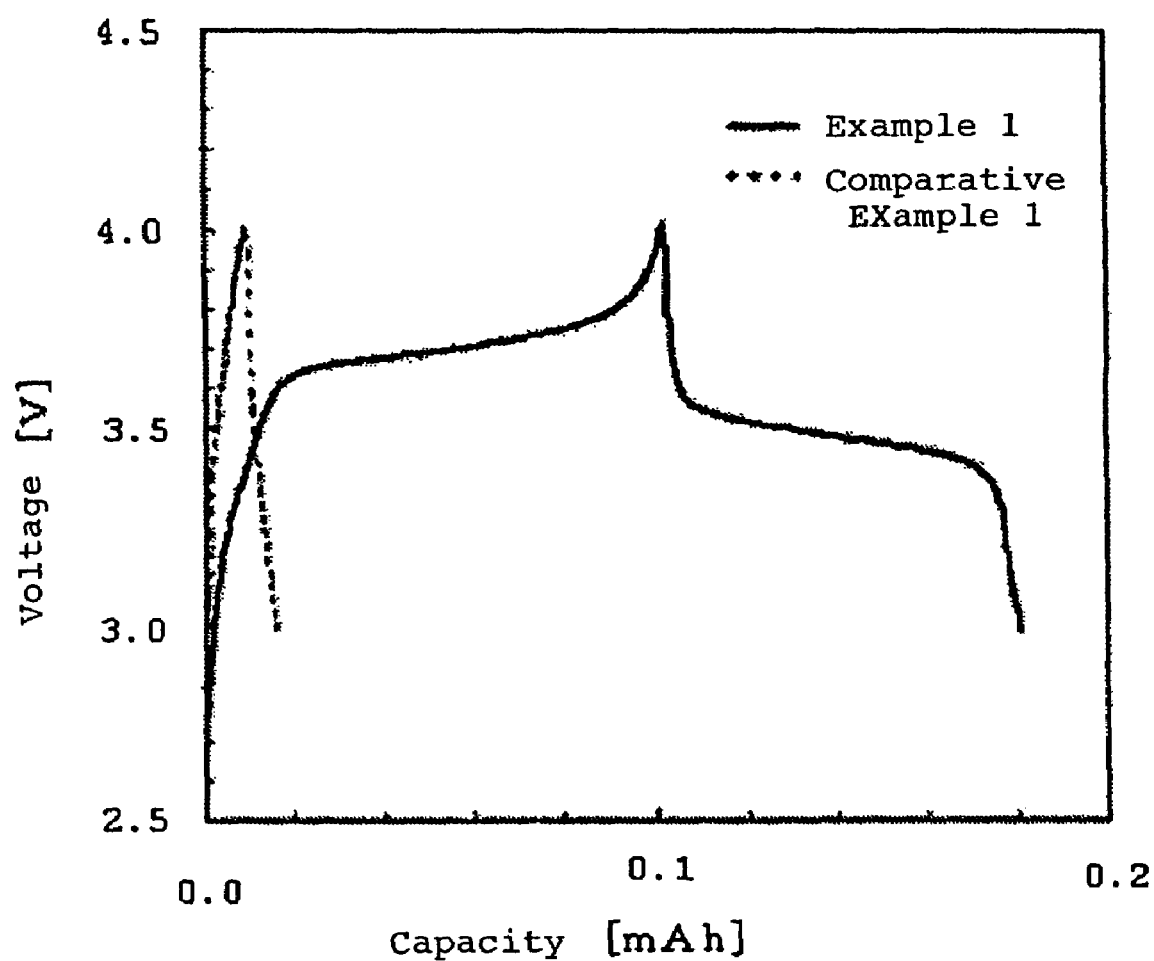
FIG. 2 is an initial charge/discharge curve for a charge storage device measured in Example 1 and Comparative Example 1.

In the manner as described above, a charge storage device was prepared, charged at a fixed current of 1 mA and discharging was conducted immediately after a voltage reached 4.0 V. A discharge current was a fixed current of 1 mA as was in charging. FIG. 2 shows a charge/discharge curve for this process. During discharge, a voltage plateau was observed around 3.6 V. It was found that the voltage plateau corresponded to a potential difference between reduction of the nitroxyl cation into the nitroxyl radical in the positive electrode and ionization of lithium metal in the negative electrode. Thus, the results implies that the charge storage device according to Example 1 works as a chemical battery.

A capacity of the charge storage device determined in Example 1 was 5.56 mAh per 1 g of the positive electrode and 55.6 mAh per 1 g of the polymethacrylate. The capacity corresponds to 50% of the theoretical capacity of the polymer.

Figure 3:
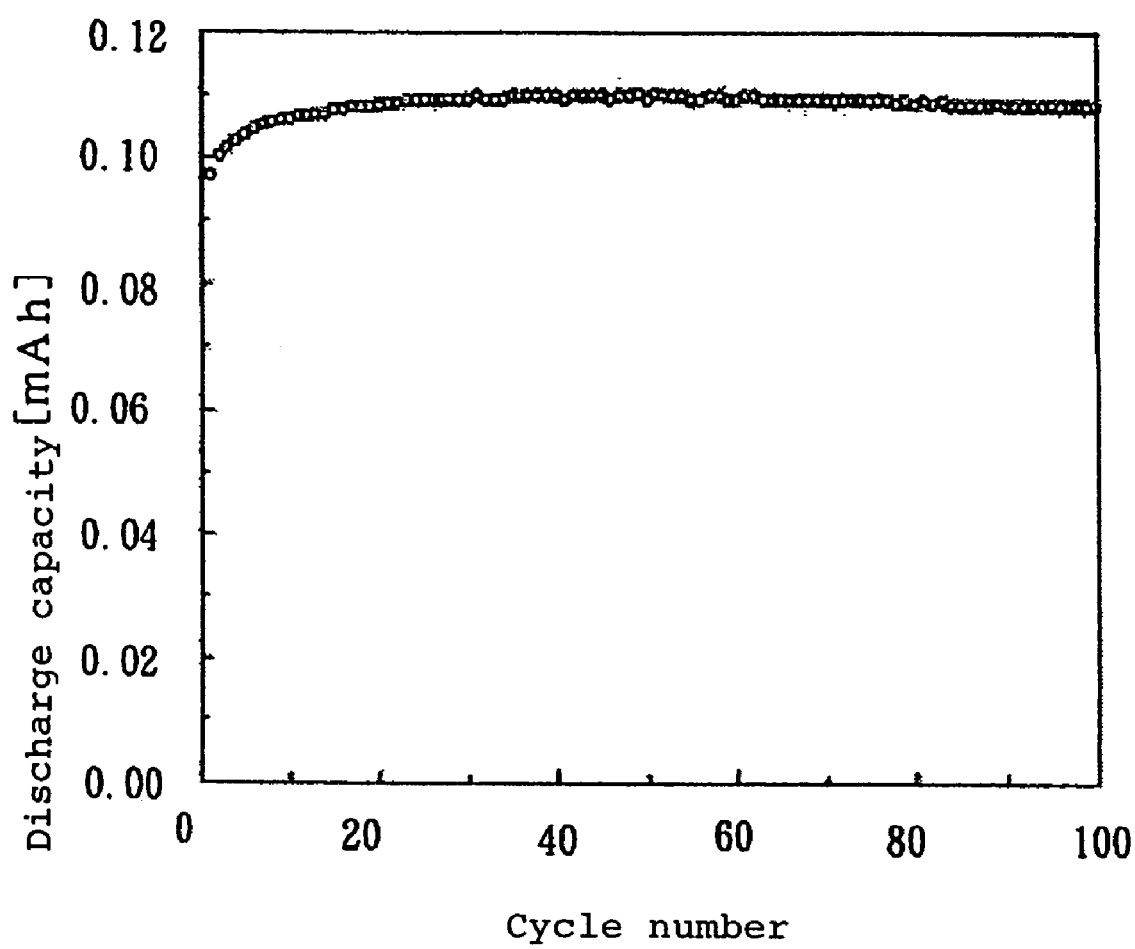
FIG. 3 shows charge/discharge cycle dependency of a discharge capacity for a charge storage device measured in Example 1.

A charge storage device was prepared as described above, and charge/discharge at 1 mA was repeated. Charge was conducted to 4.0 V and discharge was conducted to 3.0 V. FIG. 3 shows variation in a discharge capacity when the cycle was repeated 100 times. Even after repetition of charge/discharge, a capacity was not reduced. It indicates that the device is capable of performing repetitive charge/discharge for a long term.

Figure 4:
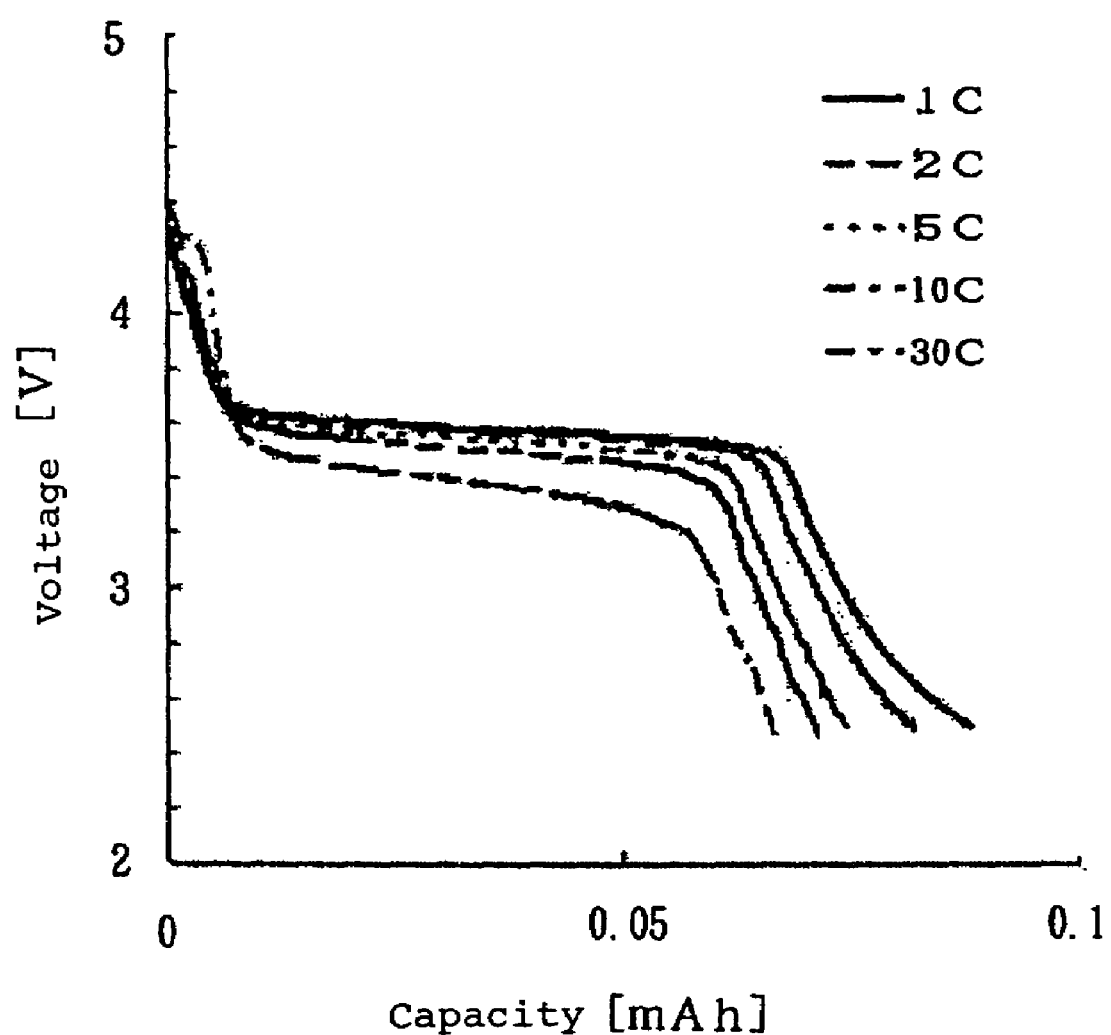
FIG. 4 shows charge/discharge rate dependency of a discharge curve for a charge storage device measured in Example 1.

FIG. 4 shows a discharge curve when conducting charge/discharge at discharge rates of 1 C, 2 C, 5 C, 10 C and 30 C for a charge storage device as described above. Charge and discharge were conducted to 4.2 V and 2.5 V, respectively. It was found that even at a discharge rate of 30 C (full charge/full discharge in 2 min), the charge storage device of this invention exhibited 70% capacity in comparison with that at a discharge rate of 1 C (full charge/full discharge in 1 hour). The results indicate that the charge storage device of this invention is insusceptible to property deterioration even when charge/discharge is conducted at a large current.

Comparative Example 1

As a comparative example, a charge storage device in which a positive electrode does not contain an organic polymer comprising a cyclic nitroxyl structure was prepared. First, 225 mg of graphite powder and 25 mg of a polytetrafluoroethylene resin binder were weighed and blended in an agate mortar. The subsequent procedure was conducted as described in Example 1, to prepare an electrode. Then, a charge storage device was assembled using an electrolyte, a separator, a positive electrode current collector and a negative electrode current collector as described in Example 1.

An equilibrium potential for the charge storage device thus prepared was 2.9 V. The charge storage device obtained was charged at a fixed current of 1 mA. Charging was terminated when a voltage reached 4.0 V and immediately after charging, discharging was conducted also at a fixed current of 1 mA. The results are shown in FIG. 2. A voltage of the charge storage device gradually and substantially linearly varies without a voltage plateau as was observed in Example 1. The gradually varying voltage would correspond to a voltage difference between a potential of the electric double layer component accumulated in the graphite powder surface and a potential in ionization of lithium metal in the negative electrode. However, a capacity was as low as 0.64 mAh per 1 g of the positive electrode.

Example 2

Twenty five milligrams of the polymethacrylate represented by formula (8) prepared above, 200 mg of graphite powder and 25 mg of a polytetrafluoroethylene resin binder were weighed and blended in an agate mortar. The subsequent procedure was conducted as described in Example 1, to prepare an electrode. Then, a charge storage device was assembled using an electrolyte, a separator, a positive electrode current collector and a negative electrode current collector as described in Example 1.

The charge storage device thus prepared had an equilibrium potential of 2.7 V. The charge storage device obtained was charged at a fixed current of 1 mA and charging was terminated when a voltage reached 4.0 V. The charge storage device after charging was disassembled. By analyzing the positive electrode, it was observed that a radical concentration was reduced and a corresponding 2,2,5,5-tetramethylpyrrolidinoxyl cation was formed. The cation was stabilized by an electrolyte anion PF$_6^-$.

In the manner as described above, a charge storage device was prepared, charged at a fixed current of 1 mA and discharging was conducted immediately after a voltage reached 4.0 V. A discharge current was a fixed current of 1 mA as was in charging. As a result, during discharge, a voltage plateau was observed. It was found that the voltage plateau corresponded to a potential difference between reduction of the nitroxyl cation into the nitroxyl radical in the positive electrode and ionization of lithium metal in the negative electrode. Thus, the results implies that the charge storage device according to Example 2 works as a chemical battery.

It was found that a capacity of the charge storage device determined in Example 2 was 5.61 mAh per 1 g of the positive electrode and 56.1 mAh per 1 g of the polymethacrylate. As in Example 1, it was confirmed that the device is capable of performing repetitive charge/discharge for a long term and is insusceptible to property deterioration even when charge/discharge is conducted at a large current.

Example 3

Twenty five milligrams of the polymethacrylate represented by formula (9) prepared above, 200 mg of graphite powder and 25 mg of a polytetrafluoroethylene resin binder were weighed and blended in an agate mortar. The subsequent procedure was conducted as described in Example 1, to prepare an electrode. Then, a charge storage device was assembled using an electrolyte, a separator, a positive electrode collector and a negative electrode collector as described in Example 1.

The charge storage device thus prepared had an equilibrium potential of 2.7 V. The charge storage device obtained was charged at a fixed current of 1 mA and charging was terminated when a voltage reached 4.0 V. The charge storage device after charging was disassembled. By analyzing the positive electrode, it was observed that a radical concentration was reduced and a corresponding 2,2,5,5-tetramethylpyrrolinoxyl cation was formed. The cation was stabilized by an electrolyte anion $PF_6^-$.

In the manner as described above, a charge storage device was prepared, charged at a fixed current of 1 mA and discharging was conducted immediately after a voltage reached 4.0 V. A discharge current was a fixed current of 1 mA as was in charging. As a result, during discharge, a voltage plateau was observed. It was found that the voltage plateau corresponded to a potential difference between reduction of the nitroxyl cation into the nitroxyl radical in the positive electrode and ionization of lithium metal in the negative electrode. Thus, the results implies that the charge storage device according to Example 3 works as a chemical battery.

It was found that a capacity of the charge storage device determined in Example 3 was 56.9 mAh per 1 g of the positive electrode and 5.69 mAh per 1 g of the polymethacrylate. As in Example 1, it was confirmed that the device is capable of performing repetitive charge/discharge for a long term and is insusceptible to property deterioration even when charge/discharge is conducted at a large current.

INDUSTRIAL APPLICABILITY

As described above, this invention can provide a charge storage device with a higher energy density which can give a large current. When a nitroxyl compound is a polymer, durability is particularly improved.

What is claimed is:

1. A charge storage device wherein a positive electrode comprises a nitroxyl compound wherein the nitroxyl compound is a compound containing a cyclic structure represented by general formula (Ia) in an oxidized state:

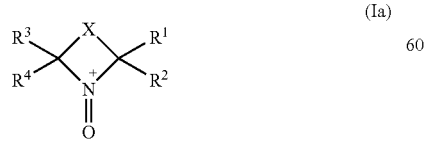

(Ia)

wherein $R^1$ to $R^4$ independently represent alkyl having 1 to 4 carbon atoms; and X represents a bivalent group forming a five-to seven-membered ring;

provided that Formula (Ia) is a low molecular weight compound or Formula (Ia) is a part of a polymer where X is a part of a side chain in the polymer or X is a part of the main chain of the polymer; and provided that the nitroxyl compound has a structure of a nitroxyl cation moiety represented by formula (I) in an oxidized state and has a structure of a nitroxyl radical moiety represented by formula (II) in a reduced state

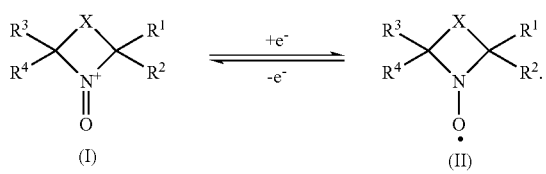

2. The charge storage device as claimed in claim 1 wherein the nitroxyl compound is a polymer having a side chain comprising the cyclic nitroxyl structure represented by formula (Ia).

3. The charge storage device as claimed in claim 1 wherein the device comprises a positive electrode, a negative electrode and an electrolyte containing an organic solvent, and the nitroxyl compound is insoluble in the electrolyte.

4. The charge storage device as claimed in claim 2 wherein the nitroxyl compound is a polymer having a side chain comprising at least one cyclic nitroxyl structure selected from the group consisting of 2,2,6,6-tetramethylpiperidinoxyl cation represented by formula (1), 2,2,5,5-tetramethylpyrrolidinoxyl cation represented by formula (2) and 2,2,5,5-tetramethylpyrrolinoxyl cation represented by formula (3).

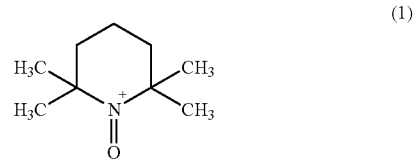

(1)

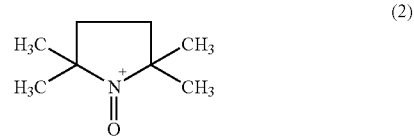

(2)

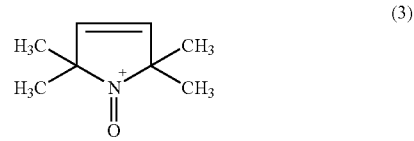

(3)

* * * * *